US011490638B2

United States Patent
Di Troia

(10) Patent No.: US 11,490,638 B2
(45) Date of Patent: Nov. 8, 2022

(54) FROZEN CONFECTION PRODUCT COMPRISING A FROZEN CONFECTION SAUCE COMPOSITION

(71) Applicant: Conopco, Inc., Englewood Cliffs, NJ (US)

(72) Inventor: Lorena Di Troia, Bedford (GB)

(73) Assignee: Conopco, Inc., Englewood Cliffs, NJ (US)

( * ) Notice: Subject to any disclaimer, the term of this patent is extended or adjusted under 35 U.S.C. 154(b) by 157 days.

(21) Appl. No.: 16/478,025

(22) PCT Filed: Jan. 19, 2018

(86) PCT No.: PCT/EP2018/051357
§ 371 (c)(1),
(2) Date: Jul. 15, 2019

(87) PCT Pub. No.: WO2018/134376
PCT Pub. Date: Jul. 26, 2018

(65) Prior Publication Data
US 2019/0350220 A1 Nov. 21, 2019

(30) Foreign Application Priority Data
Jan. 20, 2017 (EP) .................... 17152488

(51) Int. Cl.
*A23G 9/48* (2006.01)
*A23G 9/32* (2006.01)
(52) U.S. Cl.
CPC ........ *A23G 9/48* (2013.01); *A23G 9/32* (2013.01)
(58) Field of Classification Search
CPC ............. A23G 9/48; A23G 9/32; A23G 9/322
USPC ....................................................... 426/100
See application file for complete search history.

(56) References Cited

U.S. PATENT DOCUMENTS

| 4,199,605 A | 4/1980 | Kahn et al. |
| 4,414,239 A | 11/1983 | Oven |
| 5,709,896 A | 1/1998 | Hartigan et al. |
| 5,731,027 A * | 3/1998 | Cain ................ A23G 9/52 426/607 |
| 2003/0175385 A1 | 9/2003 | Helferich et al. |
| 2004/0086615 A1 | 5/2004 | Johnson et al. |
| 2008/0131564 A1 | 6/2008 | Nalur |
| 2008/0193605 A1 | 8/2008 | Gonzalez et al. |
| 2010/0159081 A1 | 6/2010 | Lind et al. |
| 2015/0327571 A1 | 11/2015 | Amend |
| 2016/0309739 A1 | 10/2016 | Chandrasekaran |
| 2016/0316784 A1 | 11/2016 | Chandrasekaran |
| 2016/0353780 A1 | 12/2016 | Schlange et al. |
| 2020/0045993 A1 | 2/2020 | Johannsen et al. |

FOREIGN PATENT DOCUMENTS

| EP | 1476025 | 11/2010 |
| GB | 1080998 | 8/1967 |
| GB | 2093679 | 9/1982 |
| WO | WO03068001 | 8/2003 |
| WO | WO2010072481 | 7/2010 |

OTHER PUBLICATIONS

Search Report and Written Opinion in EP17152488; dated May 19, 2017.
Search Report and Written Opinion in PCTEP2018051357; dated Mar. 19, 2018.

* cited by examiner

*Primary Examiner* — Jyoti Chawla
(74) *Attorney, Agent, or Firm* — Gerard J. McGowan, Jr.

(57) ABSTRACT

A novel frozen confection sauce composition comprising from 10 to 18 wt % vegetable fat that is solid at 4° C., from 24 to 32 wt % vegetable fat that is liquid at 4° C., from 5 to 10 wt % nut paste and from 30 to 40 wt % sugar. A novel frozen confection sauce composition for the reduction of sugar bloom.

Figure 1A:
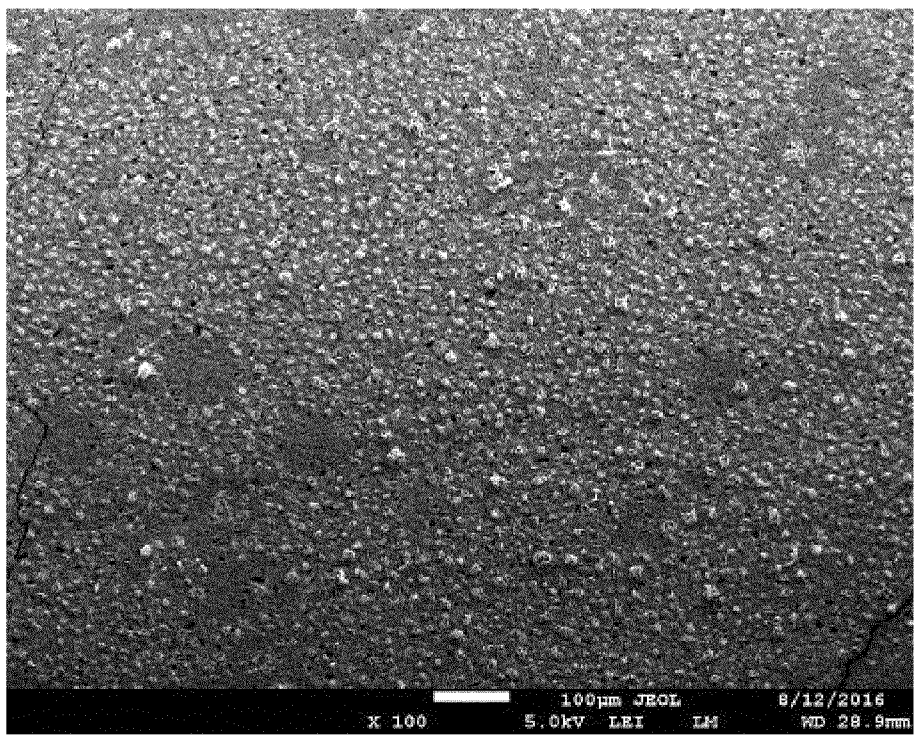

14 Claims, 8 Drawing Sheets

FROZEN CONFECTION PRODUCT COMPRISING A FROZEN CONFECTION SAUCE COMPOSITION

FIELD OF THE INVENTION

The present invention relates to a novel frozen confection sauce composition for the reduction of sugar bloom in frozen confection products.

BACKGROUND OF THE INVENTION

Bloom is a known problem when preparing chocolate-based products. Bloom is the appearance of white or cream patina on the surface of chocolate based products. Bloom occurs as two types: fat bloom or sugar bloom.

Fat bloom arises from the formation of the incorrect polymorph of the fats in cocoa butter on the surface of the chocolate-based product. Fat bloom is typically a result of incorrect tempering of the chocolate during manufacture, or re-crystallization of the fat when the chocolate-based product has been exposed to heat and is cooled. Fat bloom is overcome by controlling the temperature of the chocolate during tempering and providing a constant temperature during storage to prevent exposure to extreme temperature fluctuations. Alternatively, the cocoa butter may be substantially replaced with vegetable oils (such as coconut oil), consequently removing the requirement of tempering; however, sensorial characteristics, such as taste, may be altered by the use of vegetable oils.

Sugar bloom is typically a result of exposure of the sugar in a chocolate-based product to moisture. When the sugar is exposed to moisture, it is dissolved, followed by crystallization of the sugar on the surface of the product. The common solutions to overcome sugar bloom include minimizing the exposure of the product to moisture during manufacture and storage, and avoiding the use of hygroscopic ingredients (e.g. low grade or brown sugars).

Sugar bloom on non-chocolate based products has not been reported to date; however, it has recently been observed that sugar bloom may also occur on the surface of frozen confection sauces. As with sugar bloom on chocolate-based products, sugar bloom on frozen confection sauces can be minimized on manufacture by avoiding direct contact with humid environments. However, upon use and storage, the sauce is exposed to ambient conditions, including moisture, enabling the growth of sugar bloom when the frozen confection is re-frozen once opened (and partially used), and stored.

The prior art is silent with regard to the occurrence of sugar bloom on the surface of frozen confection sauces; sauces with similar compositions implicitly provide alternative solutions to the problem of preventing sugar bloom on frozen confection sauces, by creating a physical barrier protecting the frozen confection sauce from moisture.

EP 1 476 025 B1 discloses a frozen confection sauce that comprises at least 70 wt % fat; wherein at least 60 wt % of this fat is liquid at 4° C. in order to prevent the frozen confection sauce from cracking or shrinking from the walls of the container during storage at −23° C. The remainder of the composition may be a confectionary coating comprising cocoa butter (at least 5 wt %), fat (at least 40 wt %) and sugar (no greater than 55 wt %). However, EP 1 476 025 B1 is silent with regard to sugar bloom, this is most likely because the surface that is not in touch with the frozen confection is mostly protected from exposure to moisture via the glassy disc layered above it. The solution provided by EP 1 476 025 B1 to prevent or reduce sugar bloom on the surface of the frozen confection sauce is the provision of a glassy disc that protects the frozen confection sauce from the ambient moisture conditions within the frozen confection's container.

US 2010/0159081 A1 discloses a sauce composition comprising 10-80% dry matter (sugars), 15-70% water and 5-30% fat. The sauce is positioned at the base of the container comprising the frozen confection and is only in contact with the release agent and ice cream (frozen confection). No sugar bloom is mentioned, or expected, due to the position of the sauce in the container. US 2010/0159081 A1 provides a solution to the problem of reducing sugar bloom by protecting the frozen confection sauce from ambient moisture until the product is removed from the tub.

SUMMARY OF THE INVENTION

The present invention relates solely to a frozen confection product comprising the frozen confection sauce composition.

A frozen confection sauce composition comprising from 10 to 20 wt % vegetable fat that is solid at 4° C., from 20 to 32 wt % vegetable fat that is liquid at 4° C., from 5 to 10 wt % nut paste and from 30 to 40 wt % sugar. The frozen confection sauce composition of the present invention is observed to have reduced sugar bloom arising during manufacture and/or use of the frozen confection product. During use, reduced sugar bloom is observed when the frozen confection sauce composition is subjected to temperature fluctuations and exposed to ambient atmosphere conditions that comprise moisture, for example, air. The sauce has additional advantages that include reduced shrinkage of the sauce from the sides of the container that is visible to the consumer and the provision of a frozen confection sauce that is of a desired viscosity that aides fast manufacturing and achieves 'scoop-ability' during use.

DETAILED DESCRIPTION OF THE INVENTION

A frozen confection sauce composition comprising from 10 to 20 wt % vegetable fat that is solid at 4° C., from 20 to 32 wt % vegetable fat that is liquid at 4° C., from 5 to 10 wt % nut paste and from 30 to 40 wt % sugar.

Vegetable fat that is solid at 4° C. is selected from the group consisting of coconut oil, palm oil, palm kernel oil, hydrogenated oils and mixtures thereof. Preferably the vegetable fat that is solid at 4° C. comprises coconut oil. Preferably the vegetable fat that is solid at 4° C. is coconut oil.

Greatly reduced sugar bloom has been observed for frozen confection sauce compositions comprising from 10 to 20 wt % coconut oil, preferably from about 11 to about 18 wt % coconut oil, preferably from 11 to 16 wt % coconut oil, preferably from 11 to 15 wt % coconut oil, preferably about 15 wt % coconut oil, and preferably about 13 wt % coconut oil.

Vegetable fat that is liquid at 4° C. is selected from the group consisting of soya bean oil, cottonseed oil, peanut oil, safflower oil, corn oil, canola oil and mixtures thereof.

Preferably the vegetable fat that is liquid at 4° C. comprises soya bean oil. Preferably the vegetable fat that is liquid at 4° C. is soya bean oil. [Soya bean may also be known as soybean].

Greatly reduced sugar bloom has been observed for frozen confection sauce compositions comprising from 20 to 32 wt % soya bean oil, preferably from about 24 to about 31 wt % soya bean oil, preferably from 27 to 31 wt % soya bean oil, preferably about 27 wt % soya bean oil, and preferably about 29 wt % soya bean oil.

In an aspect of the invention the frozen confection sauce composition comprises from 30 to 52 wt % vegetable fat, preferably 34 to 50 wt % vegetable fat, preferably from 39 to 45 wt % vegetable fat, preferably about 42 wt % vegetable fat. Vegetable fat means solid or liquid fat that is derived from vegetables, for example, coconut oil is extracted from the kernel or meat of mature coconuts. The total amount of vegetable fat present in the frozen confection sauce composition excludes fat originating from components (ingredients) that comprise more than the fat from the raw material; i.e.: the weight percentage of the vegetable fat in the frozen confection sauce composition excludes fat obtained from the nut paste or additive. For example, the fat originating from the nut paste is excluded when calculating the total vegetable fat present in the frozen confection sauce composition as nut paste comprises the kernel or meat of the nut, and therefore additionally includes at least protein.

In an aspect of the invention the frozen confection sauce composition comprises from 35 to 62 wt % fat, preferably from 41 to 60 wt % fat, preferably from 45 to 55 wt % fat, preferably about 49 wt % fat. The total fat present in the frozen confection sauce composition includes fat originating from nut paste.

The frozen confection sauce composition further comprises from 30 to 40 wt % of sugar. Preferably the frozen confection sauce composition comprises from 30 to 35 wt % sugar. Preferably the frozen confection sauce composition comprises about 32 wt % sugar. Sugar is selected from the group consisting of glucose, fructose and sucrose and mixtures thereof. Preferably the sugar comprises sucrose. Preferably the sugar is sucrose.

The frozen confection sauce composition comprises from 5 to 10 wt % of a nut-based paste (nut paste), preferably about 7 wt % of a nut-based paste (nut paste) selected from the group consisting of hazelnut paste, pistachio paste, cashew paste, almond butter and mixtures thereof. Preferably the nut-based paste comprises hazelnut paste. Preferably the nut-based paste is hazelnut paste. Preferably the frozen confection sauce composition comprises from 5 to 10 wt % hazelnut paste, preferably about 7 wt % of hazelnut paste.

The frozen confection sauce composition comprises from 10 to 20 wt % of skimmed milk powder. Preferably the frozen confection sauce composition comprises from 12 to 18 wt % skimmed milk powder, preferably 15 wt % skimmed milk powder.

The frozen confection sauce optionally comprises from 2 to 5 wt % of one or more additives, preferably about 3 wt % of one or more additives. Additive means a flavouring agent or colourant and is selected from the group consisting of cocoa powder, cocoa butter, fruit, fruit extract, nut and mixtures thereof. Preferably the additive comprises cocoa powder. Preferably the additive is cocoa powder. It should be noted that some additives are both flavouring agents and colourants, for example, cocoa powder provides cocoa flavouring and a brown colourant.

In an embodiment of the invention, the frozen confection sauce composition comprises from 10 to 18 wt % vegetable fat that is solid at 4° C., from 24 to 32 wt % vegetable fat that is liquid at 4° C., from 5 to 10 wt % nut paste and from 30 to 35 wt % sugar, 12 to 18 wt % skimmed milk powder and 2 to 5 wt % cocoa powder.

In an embodiment of the invention, the frozen confection sauce composition comprises from 11 to 15 wt % vegetable fat that is solid at 4° C., from 27 to 31 wt % vegetable fat that is liquid at 4° C., 5 to 10 wt % nut paste, from 30 to 35 wt % sugar, 12 to 18 wt % skimmed milk powder and 2 to 5 wt % cocoa powder.

In an embodiment of the invention, the frozen confection sauce composition comprises from 10 to 18 wt % coconut oil, from 24 to 32 wt % soya bean oil, from 30 to 35 wt % sucrose, 5 to 10 wt % hazelnut paste, 12 to 18 wt % skimmed milk powder and 2 to 5 wt % cocoa powder.

In an embodiment of the invention, the frozen confection sauce composition comprises from 11 to 15 wt % coconut oil, from 27 to 31 wt % soya bean oil, from 30 to 35 wt % sucrose, 5 to 10 wt % hazelnut paste, 12 to 18 wt % skimmed milk powder and 2 to 5 wt % cocoa powder.

In an embodiment of the invention, the frozen confection sauce composition comprises about 15 wt % coconut oil, about 27 wt % soya bean oil, about 32 wt % sucrose, about 7 wt % hazelnut paste, about 15 wt % skimmed milk powder and about 3 wt % of one or more additives.

Frozen confection sauces are also known as variegates or syrups, as described in 'Ice Cream' $7^{th}$ Ed., Goff and Hartel, 2013, page 115, and Arbuckle 'Ice Cream' $5^{th}$ Ed., 1996, Chapman & Hall, New York. N.Y. An exemplary method of preparing a frozen confection sauce is provided by EP 1 476 025 B1 [0058] and [0059].

Frozen confection sauce compositions are typically present together with a frozen confection and optionally other components, and are held within a receptacle to form a frozen confection product.

Frozen confection means a sweet-tasting fabricated foodstuff intended for consumption in the frozen state (i.e. under conditions wherein the temperature of the foodstuff is less than 0° C.). The frozen confection is selected from the group consisting of water ice, milk-ice, ice cream, frozen yoghurt, frozen custard, sorbet, gelato and mixtures thereof.

Ice cream may be selected from the group consisting of dairy ice cream, non-dairy ice cream and mixtures thereof. Preferably the frozen confection comprises ice cream, frozen yoghurt or mixtures thereof. Preferably the frozen confection is aerated. The frozen confection may be prepared, for example, according to methods provided in the 'The Science of Ice Cream', C. Clarke, RSC 2004, chapters 3, 4 and 8; and 'Ice Cream' $5^{th}$ Ed., Marshall and Arbuckle, 1996, Chapman & Hall, New York. N.Y., in particular chapters 11, 12 and 22.

Frozen confection compositions typically comprise flavours and/or colourants. The frozen confection of the present invention optionally comprises one or more flavours, colourants and mixtures thereof. Exemplary flavours and colourants, for example chocolate (cocoa powder or butter), strawberry (natural extracts or synthetic compounds), vanilla (essence), natural and artificial plant extracts are described in 'The Science of Ice Cream', C. Clarke, RSC 2004, pages 54-57; and 'Ice Cream' $5^{th}$ Ed., Marshall and Arbuckle, 1996, Chapman & Hall, New York. N.Y., in particular chapters 7 and 22.

Frozen confection products comprising one or more frozen confections and a frozen confection sauce composition optionally comprising one or more additional components such as inclusions, one or more frozen confection sauces or mixtures thereof. Inclusions include for example, fruit pieces, chocolate pieces, confectionary, nuts and bakery goods (wafer, biscuit and cake pieces), as described in 'The Science of Ice Cream', C. Clarke, RSC 2004, page 54-59. Additional components may be selected from the group consisting of inclusions, one or more frozen confection sauces and mixtures thereof. The frozen confection sauce composition, wherein at least part of the frozen confection sauce composition is positioned on top of the one or more frozen confections, may further comprise a dry coating, such as inclusions, as described in the 'The Science of Ice Cream', C. Clarke, RSC 2004, page 98.

The frozen confection product is prepared by dosing one or more frozen confections into a receptacle such as a tub, container, or cone, optionally simultaneously or independently of any additional component such as one or more frozen confection sauce compositions, one or more inclusions and optionally inclusions.

Typically, one or more frozen confection sauces are mixed into the frozen confection, optionally together with one or more inclusions, to form a frozen confection comprising ribbons of frozen confection sauce compositions and inclusions. All or substantially all of the inclusions are distributed within the frozen confection, see for example US 2010/0159081 A1 and in 'The Science of Ice Cream', C. Clarke, RSC 2004, Chapter 5, in particular pages 84-85. US 2010/0159081 A1, FIG. 5, illustrates inclusions distributed within a frozen confection.

Typically, the frozen confection product receptacle is sealed with a means for closure, for example a sealant, seal and/or lid.

In an aspect of the present invention at least part of the frozen confection sauce composition is positioned on at least one surface of the one or more frozen confections. Preferably, at least part of the frozen confection sauce composition is positioned on top of one or more frozen confections. Preferably, one or more frozen confections have been dosed into a receptacle and at least part of the frozen confection sauce composition is positioned on top of the one or more frozen confections. Preferably, the frozen confection sauce composition covers at least a substantial part of the top surface of the one or more frozen confections. Preferably, the frozen confection sauce composition fully covers the top surface of the one or more frozen confections.

Positioning of the sauce on at least one surface of the one or more frozen confections results in the contact of the frozen confection sauce composition with the gaseous atmosphere comprised within the receptacle comprising the frozen confection. An exemplary method of preparing a frozen confection product wherein the frozen confection sauce composition is dosed on at least one surface of the frozen confection, for example the top, is described in EP 1 476 025 B1 (prior to addition of the glass disc).

A further embodiment of the invention is a method for the preparation of a frozen confection product comprising the steps of:
  a. Dosing a receptacle with one or more frozen confections;
  b. Optionally, simultaneously or independently of step a., dosing the receptacle with one or more other components;
  c. Optionally, simultaneously or independently of step a. or b., dosing the receptacle with one or more frozen confection sauce compositions;
  d. Dosing the product of steps a., b. or c. simultaneously or independently of step a., with a frozen confection sauce composition;
  e. Sealing the receptacle with a means for closure.

A further embodiment of the invention is a method for the preparation of a frozen confection product comprising the steps of:
  a. Dosing a receptacle with one or more frozen confections;
  b. Optionally, simultaneously or independently of step a., dosing the receptacle with one or more other components;
  c. Optionally, simultaneously or independently of step a. or b., dosing the receptacle with one or more frozen confection sauce compositions;
  d. Dosing the product of steps a., b. or c., with a frozen confection sauce composition;
  e. Sealing the receptacle with a means for closure.

A further embodiment of the invention is a method for the preparation of a frozen confection product comprising the steps of:
  a. Dosing a receptacle with one or more frozen confections;
  b. Optionally, simultaneously or independently of steps a., dosing the receptacle with one or more other components;
  c. Optionally, simultaneously or independently of step a. or b., dosing the receptacle with one or more frozen confection sauce compositions;
  d. Dosing the product of steps a., b. or c. simultaneously or independently of step a., with a frozen confection sauce composition;
  e. Dosing the product of step d. with one or more inclusions;
  f. Sealing the receptacle with a means for closure.

Wherein at least part of the frozen confection sauce composition of step d. is positioned on at least one surface of the one or more frozen confections.

Wherein at least part of the frozen confection sauce composition of step d. is positioned on at least one surface of the one or more frozen confections, wherein the surface is the top surface of the frozen confection.

In a further embodiment of the invention, the frozen confection sauce composition substantially reduces sugar bloom that arises when the frozen confection product comprising the frozen confection sauce composition is subjected to temperature fluctuations between from −15° C. to −30° C. and room temperature and ambient atmospheric conditions. Preferably, the frozen confection sauce composition substantially reduces sugar bloom that arises when the frozen confection product comprising the frozen confection sauce composition is subjected to temperature fluctuations between from −15° C. to −30° C. and room temperature and the contents of the receptacle are exposed to ambient atmospheric conditions. Ambient atmospheric conditions include, for example, air.

A frozen confection product may be subjected to temperature fluctuations means allowing a frozen confection product to warm from between from −15° C. to −30° C. to room temperature, by allowing it to stand for approximately 10 minutes and/or until the product reaches, for example, from about −3° C. to about −8° C. When the frozen confection product has reached about −3° C. to about −8° C., it is possible to remove all or part of the frozen confection product content using a utensil, such as a spoon, this process may be known as the 'scoop-ability' of the product content. Any remaining frozen confection product content that is not removed from the receptacle is re-cooled to from −15° C. to −30° C., and stored until the procedure is repeated.

A further aspect of the present invention is a frozen confection sauce composition for the reduction of sugar bloom in frozen confection products. A further aspect of the present invention is a frozen confection sauce composition according to the present invention for the reduction of sugar bloom in frozen confection products.

A further embodiment of the present invention is a frozen confection sauce composition according to the present invention for the reduction or sugar bloom in frozen confection products wherein the frozen confection product is subjected to temperature fluctuations from −15° C. to −30° C. and room temperature and the contents of the receptacle are exposed to ambient atmospheric conditions, for example, air.

A further embodiment of the present invention is a frozen confection sauce composition according to the present invention for the reduction or sugar bloom in frozen confection products wherein the frozen confection product is subjected to temperature fluctuations from −15° C. to −30° C. and room temperature and the contents of the receptacle are exposed to ambient atmospheric conditions, for example, air, when the frozen confection product is allowed to stand at room temperature.

The use of the expression: 'from −15° C. to −30° C.' is intended to refer to the temperature of the frozen confection product during storage. The range 'from −15° C. to −30° C.' is provided as the temperature of storage facilities, such as freezers, vary greatly in at least two variables: the temperature that the freezer is set to and the temperature of the contents. For example, an industrial freezer may be set at −23° C. in order to ensure the contents contained within have a temperature of at least −18° C. The temperature of domestic freezers varies greatly depending on the choice of temperature set by the user.

EXAMPLES

General Examples

A. Frozen Confection Sauce Composition and Preparation:

A frozen confection sauce composition with the composition provided in Table 1 and used in Examples 1 to 4 was prepared by mixing the nut paste, sugar, skimmed milk powder and remainder ingredients with some of the combined vegetable fat composition until a fine powder is obtained. The remaining combined vegetable fat composition was added to the mix by mixing and a sauce was obtained. The sauce is then prepared and applied to the frozen confection according to the process provided in EP 1 476 025 B1 [0058] and [0059].

TABLE 1

Frozen Confection Sauce Composition General Composition:

|  | Wt % of composition |
|---|---|
| Vegetable fat (solid at 4° C.) | 10-18% |
| Vegetable fat (liquid at 4° C.) | 24-32% |
| Nut Paste | 5-10% |
| Sugar | 30-40% |
| Skimmed milk powder | 12-18% |
| Remainder (not water) | 2-5% |

The vegetable fat (solid at 4° C.) present in the composition was varied, the variation in vegetable fat (solid at 4° C.) is compensated for by varying the content of vegetable fat (liquid at 4° C.). The wt % of remaining ingredients were identical for both A1 and A2.

Specific Compositions:

Frozen Confection Sauce Composition A1. Combined Vegetable Fat Composition:

Vegetable fat (solid at 4° C.) (Coconut oil): 13 wt %.

Vegetable fat (liquid at 4° C.) (Soya bean oil): 29 wt %.

Frozen Confection Sauce Composition A2. Combined Vegetable Fat Composition:

Vegetable fat (solid at 4° C.) (Coconut oil): 19 wt %.

Vegetable fat (liquid at 4° C.) (Soya bean oil): 23 wt %.

B. Frozen Confection Composition and Preparation:

Frozen confection is prepared according to 'Ice Cream' 5th Ed., Marshall and Arbuckle, 1996, Chapman & Hall, New York. N.Y. A milk fat source, solids, stabilizers and emulsifiers are blended to ensure complete mixing of liquid and dry ingredients. The mixture is then pasteurized and homogenized to decrease the milk fat globule size to form a better emulsion and contribute to a smoother, creamier ice cream. The mixture is then cooled down and aged to allow the milk fat to partially crystallize and the gives the proteins stabilizers time to hydrate. Colours and flavours may be added to the mix before freezing.

C. Frozen Confection Product and Preparation:

The frozen confection product is prepared according to EP 1 476 025 B1. Frozen confection sauce composition (either A1 or A2) was dosed on top of a frozen confection (held in a receptacle and prepared according to method B). The frozen confection product was cooled and stored at about −18° C.

D. CRYO-SEM Surface Imaging:

First the sample is cryo-fixed, generally by plunging it into sub-cooled nitrogen close to the freezing point of nitrogen, then the sample is transferred in vacuo to the cold-stage of the SEM cryo-preparation chamber, where fracturing can be performed if necessary. After sputter coating with metal, the sample is transferred into the SEM chamber, where it remains frozen during imaging on another cold-stage, cooled by nitrogen. The surface of each example was cooled down to −196° C. and CRYO-SEM surface images were obtained at 100× magnification and 1000× magnification.

All CRYO-SEM surface images at 100× magnification displayed white structures on flat surfaces, in most cases the white structures appear to be on average approximately 10 μm in diameter. At 1000× magnification, it can be seen that the white structures appear to be in a cage-type formation, i.e. a structure with what appears to be a hollow centre.

Sugar bloom is formed when water on the surface of the frozen confection sauce composition dissolves sugar and is frozen. Upon freezing, the water-sugar solution freezes forming ice surrounded by sugar, it is likely that the sugar is in a substantially crystallised form. Upon sublimation of the ice during CRYO-SEM surface imaging, the ice is removed from the ice-sugar structure resulting in sugar crystals. It would appear that the ice of the sugar bloom occurs inside a structure of sugar, hence when the ice is removed during sublimation, the remaining white structure appears hollow.

Water is present on the surface of the frozen confection sauce composition as a consequence of condensation of moisture present in the gaseous atmosphere present within the container. Additionally, during use, when the lid of the frozen confection product is removed and the frozen confection sauce composition with a temperature of about −18° C. is allowed to stand at room temperature, moisture present in the ambient atmosphere condenses on the surface of the frozen confection sauce composition. Therefore, it is expected that removal of the lid during use would result in an increase in sugar bloom on the surface of the frozen confection sauce composition when the frozen confection product is re-cooled to about −18° C. after being allowed to stand at room temperature for about 25 minutes.

Example 1

A frozen confection product comprising a frozen confection sauce composition corresponding to A1 was prepared according to method C. and after 24 hours was allowed to stand at room temperature for 25 minutes with the lid on. After standing at room temperature for 25 minutes, the frozen confection product was cooled to −18° C. and for 24 hours. After storage the frozen confection product was assessed by eye for sugar bloom. Very little sugar bloom was apparent from both CRYO-SEM surface images and an image of the frozen confection sauce composition.

Figure 1B:
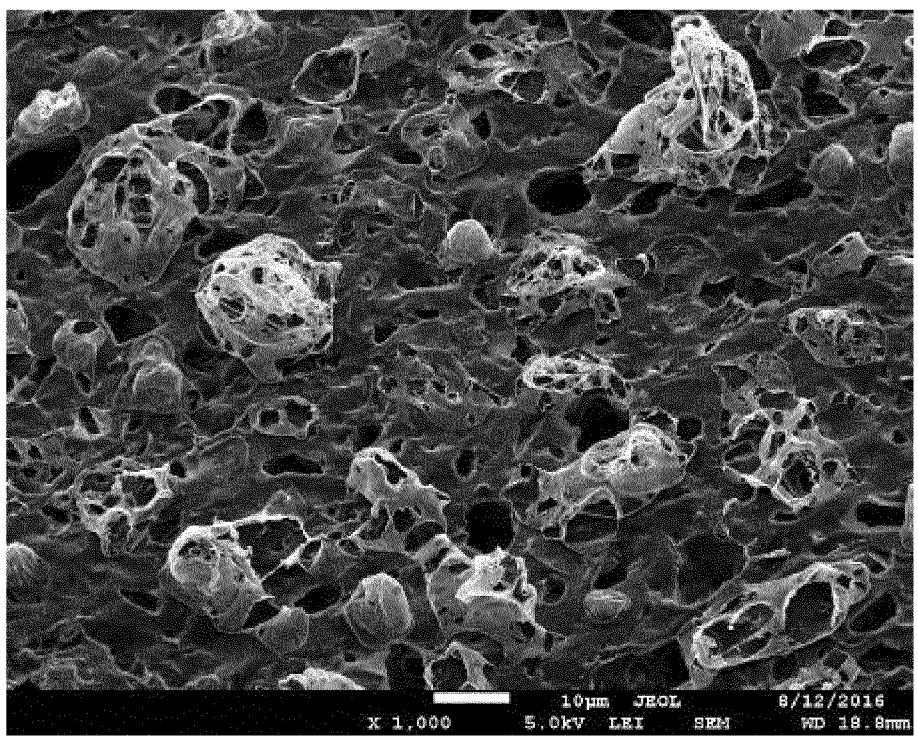

FIGS. 1A and 1B Illustrate the CRYO-SEM surface images of the frozen confection sauce composition of example 1.

Figure 1C:
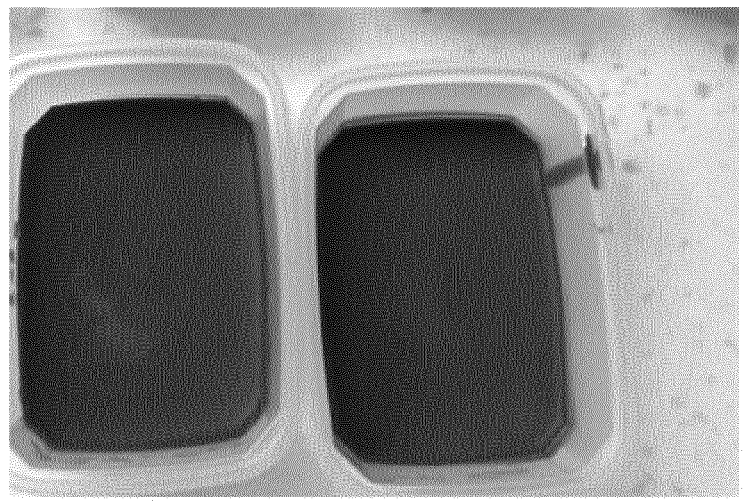

FIG. 1C Image of frozen confection sauce composition according to Example 1. Very little or no sugar bloom is observed.

Example 2

A frozen confection product comprising a frozen confection sauce composition corresponding to A1 was prepared according to method C. and after 24 hours was allowed to stand at room temperature for 25 minutes with the lid off. After standing at room temperature for 25 minutes, the frozen confection product was cooled again to −18° C. and stored for another 24 hours. After storage, the frozen confection product was assessed by eye for sugar bloom. Very little sugar bloom was apparent.

Figure 2A:
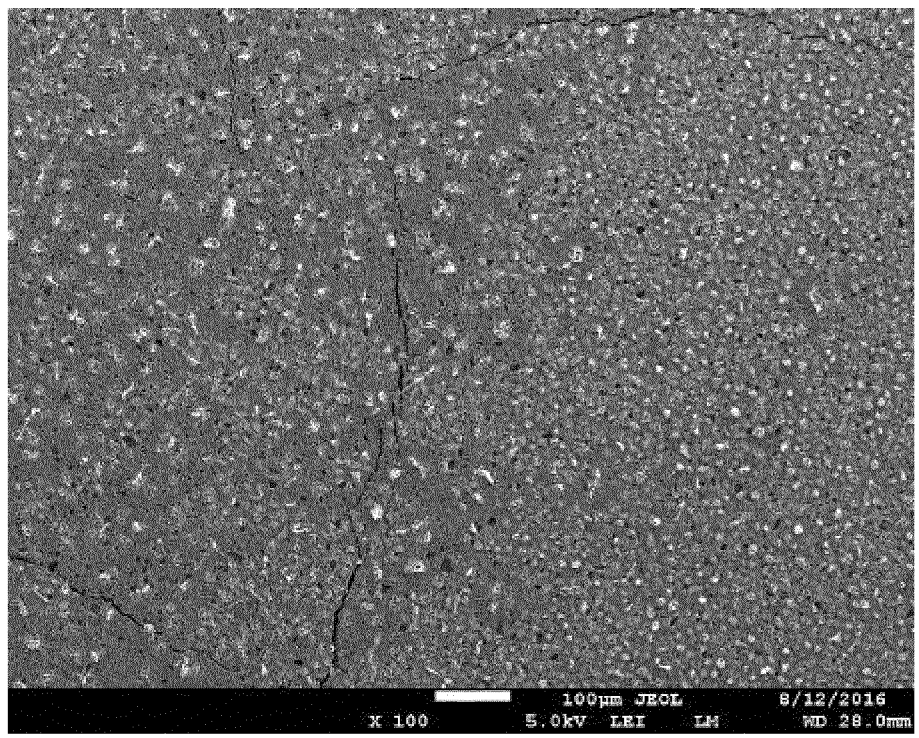
Figure 2B:
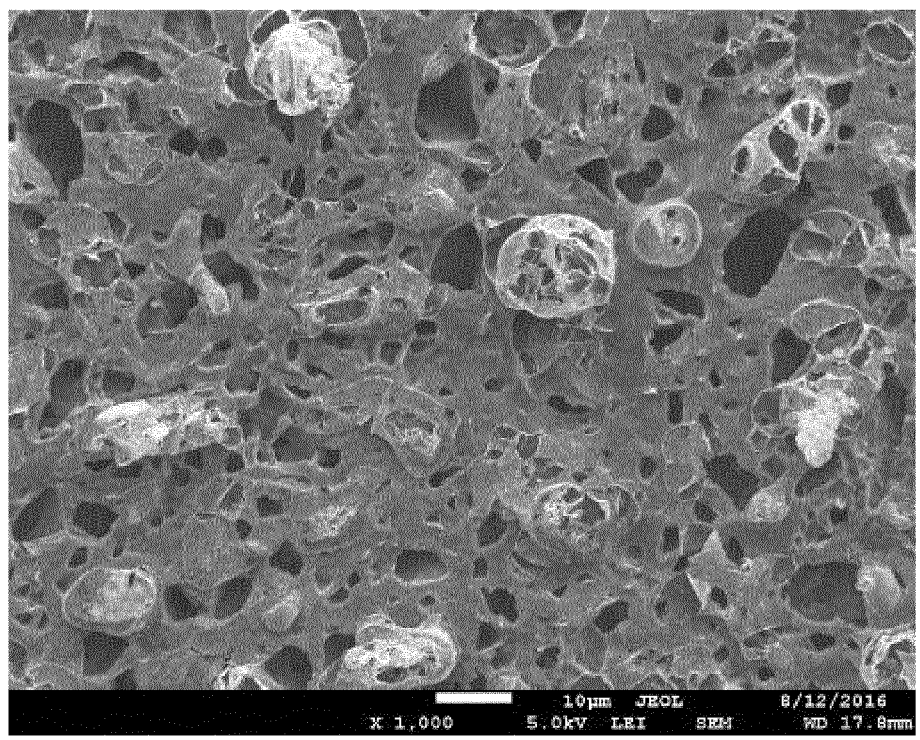

FIGS. 2A and 2B Illustrate the CRYO-SEM surface images of the frozen confection sauce composition of Example 2. The CRYO-SEM surface images of Examples 1 and 2 appear to be similar and it can be concluded that minimal sugar bloom appeared as a consequence of exposing the frozen confection sauce composition to ambient atmospheric conditions.

Figure 2C:
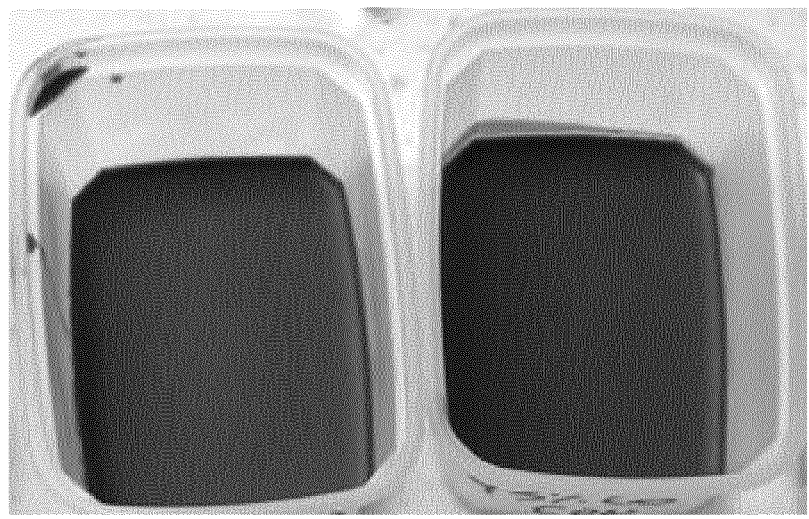

FIG. 2C Image of frozen confection sauce composition according to Example 2. Very little or no sugar bloom is observed, corresponding to the results of Example 1.

Example 3

Example 1 was repeated for a frozen confection product comprising a frozen confection sauce composition corresponding to A2.

After storage, the frozen confection product was assessed by eye for sugar bloom. Very little sugar bloom was apparent.

Figure 3A:
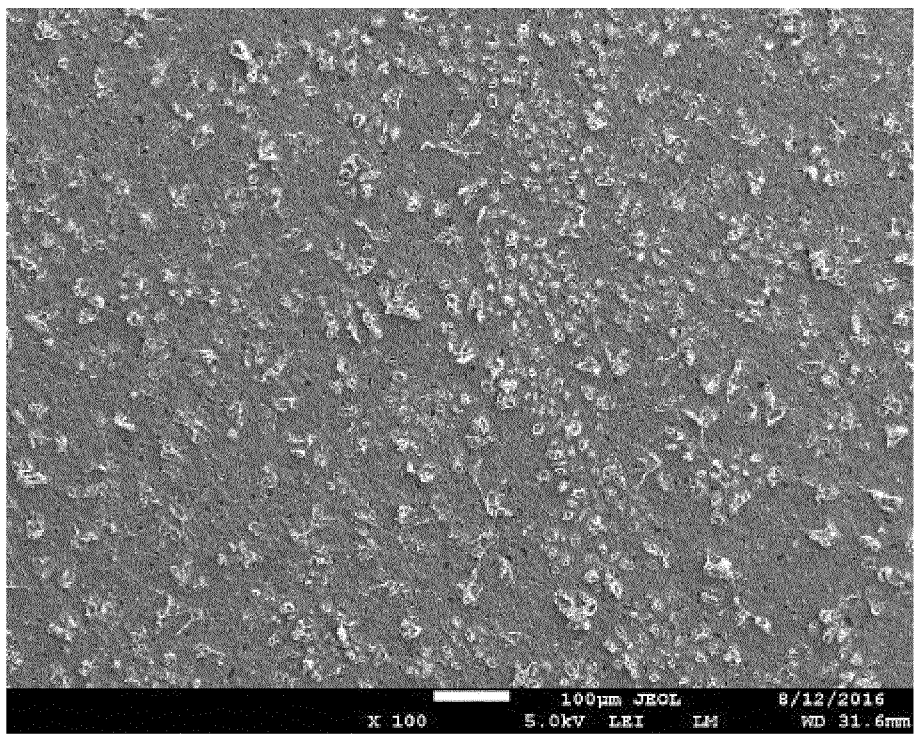
Figure 3B:
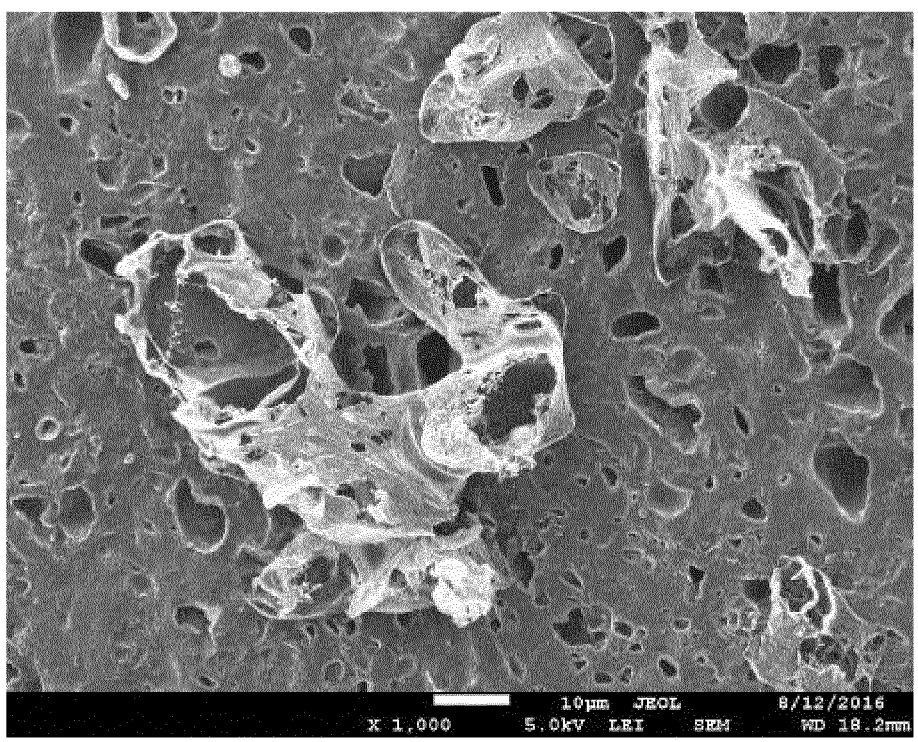

FIGS. 3A and 3B Illustrate the CRYO-SEM surface images of the frozen confection sauce composition of Example 3.

Figure 3C:
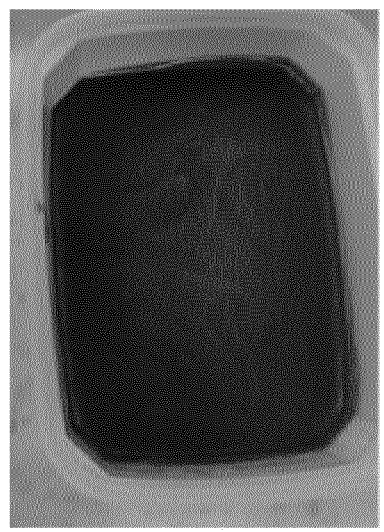

FIG. 3C Image of frozen confection sauce composition according to Example 3.

When FIGS. 3A and 3B are compared to FIGS. 1A, 1B, 2A and 2B, the amount of sugar bloom appears to be approximately similar; although the sugar structures appear to be fewer but larger more irregular structures.

When FIG. 3C is compared to FIGS. 1C and 2C, it can be seen that a small amount of sugar bloom is present.

Example 4

Example 2 was repeated for a frozen confection product comprising a frozen confection sauce composition corresponding to A2.

After storage, the frozen confection product was assessed by eye for sugar bloom. Significant sugar bloom was apparent.

Figure 4A:
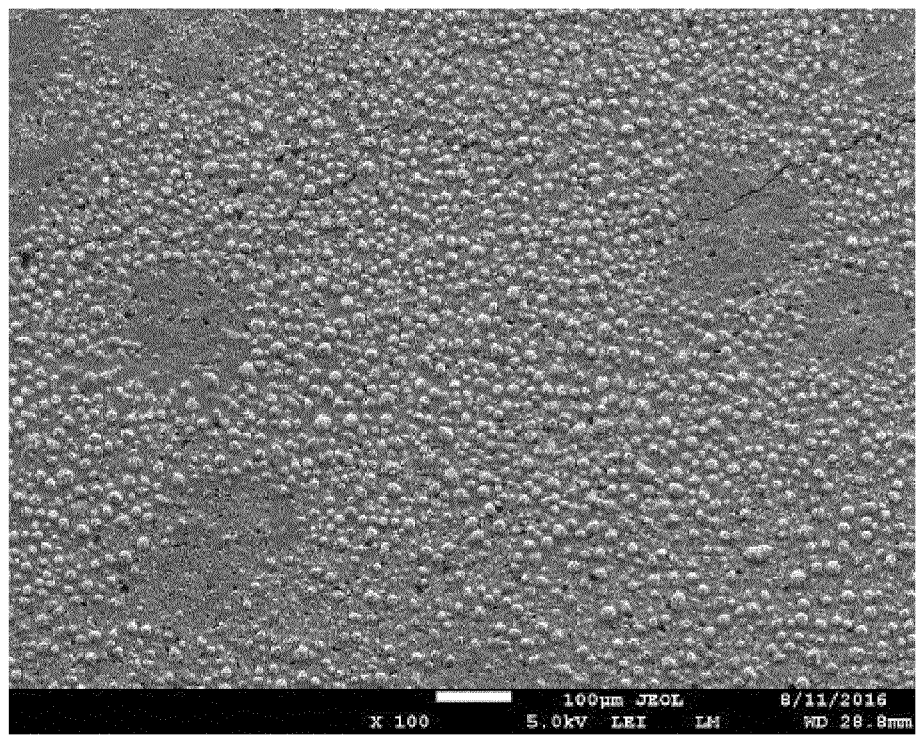
Figure 4B:
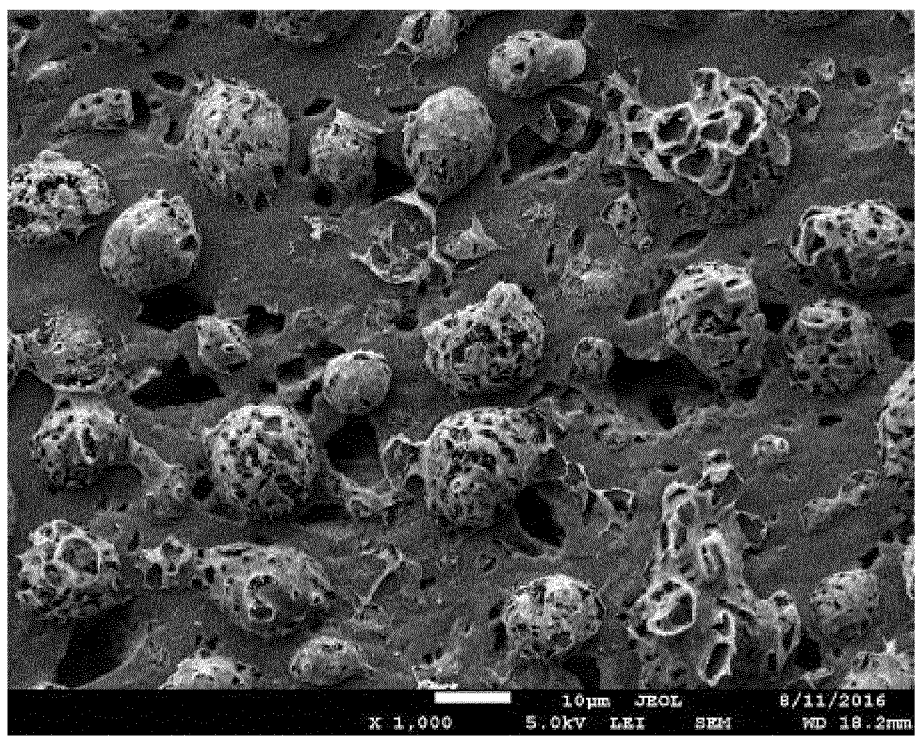

FIGS. 4A and 4B Illustrate the CRYO-SEM surface images of the frozen confection sauce composition of Example 4.

Figure 4C:
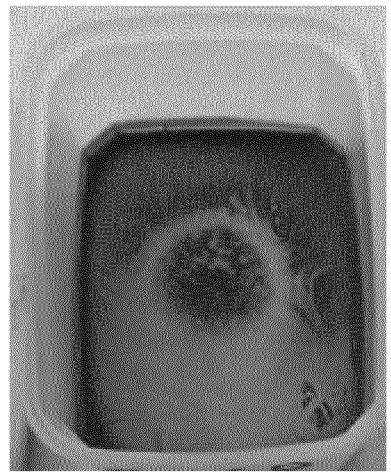

FIG. 4C Image of frozen confection sauce composition according to Example 4.

When FIGS. 4A, 4B and 4C are compared to FIGS. 3A, 3B and 3C, the amount of sugar bloom in FIGS. 4A, 4B and 4C is significantly greater.

The invention claimed is:

1. A frozen confection product which includes both i) one or more frozen confections and ii) one or more frozen confection sauce compositions, iii) the one or more sauce compositions comprising from 10 to 18 wt % vegetable fat that is solid at 4° C., from 24 to 32 wt % vegetable fat that is liquid at 4° C., from 5 to 10 wt % nut paste and from 30 to 40 wt % sugar and optionally an additive which is a flavouring agent or colourant and is selected from the group of cocoa powder, cocoa butter, fruit, fruit extract, nut and mixtures thereof, wherein the weight percentage of the vegetable fat in the frozen confection sauce composition excludes fat obtained from ingredients that comprise more than fat and wherein the weight percentage of the vegetable fat in the frozen confection sauce composition excludes fat obtained from the additive.

2. A frozen confection product according to claim 1, wherein the vegetable fat that is solid at 4° C. is selected from the group consisting of coconut oil, palm oil, palm kernel oil, hydrogenated oils and mixtures thereof.

3. A frozen confection product according to claim 1, wherein the vegetable fat that is solid at 4° C. comprises coconut oil.

4. A frozen confection product according to claim 1, wherein the vegetable fat that is liquid at 4° C. is selected from the group consisting of soya bean oil, cottonseed oil, peanut oil, safflower oil, corn oil, canola oil and mixtures thereof.

5. A frozen confection product according to claim 1, wherein the vegetable fat that is liquid at 4° C. comprises soya bean oil.

6. A frozen confection product according to claim 1, wherein the nut paste comprises hazelnut paste.

7. A frozen confection product according to claim 1, wherein the sugar is selected from the group consisting of glucose, fructose and sucrose and mixtures thereof.

8. A frozen confection product according to claim 1, wherein the sugar comprises sucrose.

9. A frozen confection product according to claim 1, wherein the frozen confection sauce further comprises an additive selected from one or more of the group consisting of cocoa powder, cocoa butter, fruit, fruit extract, nut and mixtures thereof.

10. A frozen confection product according to claim 1, wherein the frozen confection sauce further comprises skimmed milk powder.

11. A frozen confection product according to claim 1, wherein the frozen confection sauce composition comprises from 35 to 62 wt % total fat present in the frozen confection sauce composition including fat originating from nut paste.

12. A frozen confection product according to claim 1, wherein the one or more frozen confections comprises one or more of the group consisting of one or more ice creams and frozen yogurt.

13. A frozen confection product according to claim 1, wherein part of the frozen confection sauce composition is in contact with a gaseous atmosphere.

14. A method for the preparation a frozen confection product according to claim 1 comprising the steps of:
   a. Dosing a receptacle with one or more frozen confections;
   b. Optionally, simultaneously or independently of step a., dosing the receptacle with one or more other components;
   c. Optionally, simultaneously or independently of step a. or b., dosing the receptacle with one or more frozen confection sauce compositions;
   d. Dosing the product of steps a, b. or c. with a frozen confection sauce composition;
   e. Sealing the receptacle with a means for closure.

* * * * *